US008918109B1

(12) United States Patent
Stewart (10) Patent No.: US 8,918,109 B1
(45) Date of Patent: Dec. 23, 2014

(54) USING A COVERAGE AREA IDENTIFIER TO FACILITATE NETWORK REPORTING

(71) Applicant: Sprint Spectrum L.P., Overland, KS (US)

(72) Inventor: Scott R. Stewart, Lithia Springs, GA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/933,948

(22) Filed: Jul. 2, 2013

(51) Int. Cl.
*H04W 40/00* (2009.01)
*H04W 16/24* (2009.01)

(52) U.S. Cl.
CPC ..................................... *H04W 16/24* (2013.01)
USPC ......................................................... 455/446

(58) Field of Classification Search
CPC ...... H04W 16/00; H04W 16/24; H04W 16/18
USPC ....................... 455/422.1, 446–449
See application file for complete search history.

(56) References Cited

U.S. PATENT DOCUMENTS

| 6,915,128 | B1 | 7/2005 | Oh |
| 8,081,724 | B2* | 12/2011 | Rajkotia ........................ 375/356 |
| 2005/0079878 | A1* | 4/2005 | Smith et al. ................ 455/456.5 |
| 2010/0285793 | A1* | 11/2010 | Yoon et al. ................. 455/422.1 |
| 2013/0052959 | A1 | 2/2013 | Rubin et al. |

* cited by examiner

*Primary Examiner* — Ajit Patel (57) ABSTRACT

Disclosed herein is a method and system for parsing a coverage area identifier. An example method is operable in a wireless communication system having a base station and a wireless communication device (WCD), the base station radiating to define multiple coverage areas in which the WCD can operate. The method involves: the WCD operating within one of the multiple coverage areas; the WCD receiving from the base station a coverage area identifier of the coverage area in which the WCD operated; the WCD determining a group to which the base station belongs; the WCD using the determined group as a basis to select a parsing technique from multiple parsing techniques; and the WCD using the selected parsing technique to parse the received coverage area identifier so as to extract from the received coverage area identifier one or more attributes of the coverage area in which the WCD operated.

20 Claims, 7 Drawing Sheets

USING A COVERAGE AREA IDENTIFIER TO FACILITATE NETWORK REPORTING

BACKGROUND

Unless otherwise indicated herein, the materials described in this section are not prior art to the claims and are not admitted to be prior art by inclusion in this section.

Wireless communication devices (WCDs), such as cellular phones and tablets have become increasingly popular in recent years. In general, a WCD may be capable of placing a call or accessing the Internet from any place inside a coverage area of a wireless communication network.

A typical wireless communication network includes a number of base stations that radiate to define coverage areas, such as cells and cell sectors, in which WCDs may operate. In turn, each base station may be coupled with a network infrastructure that provides connectivity with one or more transport networks, such as the public switched telephone network (PSTN) and/or the Internet for instance. With this arrangement, a WCD within coverage of the wireless communication network may engage in air interface communication with a base station and may thereby communicate via the base station with various remote network entities or with other WCDs served by the base station. The combination of network entities that provides a connection between the WCD and the transport network may be considered a radio access network (RAN).

In some instances, a wireless communication network may become congested or be interfered with by an external source (e.g., a microwave oven), thereby impairing its operation. For example, as an increased number of WCDs operate within a given coverage area, interference between the WCDs may increase. To reduce such interference, the base station providing the coverage area may instruct the WCDs to decrease their transmission power, and the base station may itself decrease its transmission power. However, such decreases in transmission power may reduce the quality of service that the base station provides to the WCDs.

Further, the evolution of cities and landscapes may impair the operation of a wireless communication network. For instance, as buildings and trees rise in or around a coverage area, the radiation pattern of the coverage area may change. This may cause the signal quality to degrade, which in turn may reduce the quality of service that the base station provides to the WCDs operating in the coverage area.

To help remedy these and other operational impairments, a service provider may make changes to the wireless communication network, such as by adding, removing, repositioning, or reconfiguring base stations or cell sectors, or by reallocating frequencies among various coverage areas. In some instances, the service provider may monitor various properties of the wireless communication network to determine when and where to make such changes.

OVERVIEW

A service provider may monitor properties of a wireless communication network in a variety of ways. For example, the service provider may transport through the network WCDs that are configured to routinely attempt to connect to the network, and to make determinations related to each such attempt. By way of example, for a given attempt, a WCD may determine whether the attempt was successful, and the WCD may determine the current date and time and the current position of the WCD. Further, the WCD may make determinations relating to the quality of the established connection (i.e., between the WCD and the serving base station). For example, the WCD may determine a signal-to-noise ratio and/or received signal strength.

The WCD may then report these properties to a service provider such that the service provider may analyze them and assess a condition of the network. For example, the service provider may analyze these properties to determine the presence and/or quality of service in one or more coverage areas.

In some instances, it may also be helpful for a WCD to determine one or more attributes of a coverage area in which the WCD operated (and may still be operating within), and to report such properties to a service provider. The one or more attributes may identify the network equipment that provides the coverage area. By way of example, the one or more attributes may take the form of a tower identifier, which identifies the base station itself, and a sector identifier, which identifies a sector of the base station. By receiving the one or more attributes, the service provider may determine which equipment may need to be serviced in order to address a particular type of issue experienced by a WCD operating in the coverage area.

As a WCD operates in a coverage area, the serving base station may provide to the WCD a coverage area identifier that includes, embedded therein according to a particular format, one or more attributes of the coverage area as discussed above. Once the WCD receives the coverage area identifier, the WCD may parse the identifier in a manner consistent with the identifier's format so as to extract the one or more attributes included therein.

Notably however, not all coverage area identifiers have the same format. This may be due to different base station vendors each using a different vendor-specific format, for instance. By way of example, a first vendor of a first group of base stations may use coverage area identifiers that have a first format, and a second vendor of a second group of base stations may use coverage area identifiers that have a second format. Accordingly, even if a WCD receives a coverage area identifier from its serving base station, the WCD (or another entity) would need to know the format of the identifier in order to parse the identifier and extract the one or more attributes included therein.

The disclosed method and corresponding system help address this issue. In one respect, disclosed is a method operable in a wireless communication system having a base station and a WCD, where the base station radiates to define multiple coverage areas in which the WCD can operate, and where each coverage area has a respective coverage area identifier. The method may involve the WCD operating within one of the multiple coverage areas, and the WCD receiving from the base station a coverage area identifier of the coverage area in which the WCD operated. Further, the method may involve the WCD determining a group to which the base station belongs, and the WCD using the determined group as a basis to select a parsing technique from multiple parsing techniques. Yet further, the method may involve the WCD using the selected parsing technique to parse the received coverage area identifier so as to extract from the received coverage area identifier one or more attributes of the coverage area in which the WCD operated.

Accordingly, the WCD may receive multiple coverage area identifiers, with each identifier having a different format, and the WCD may be able to extract the one or more attributes included in each one. The WCD may then report the extracted one or more attributes to a service provider. And the service provider may use the one or more attributes to perform various functions, such as servicing the equipment providing the coverage area as described above.

The WCD may determine the group to which the base station belongs in a variety of ways. For example, the WCD may receive from the base station a system identifier (SID) and/or a network identifier (NID). In some instances, the SID and/or NID may be unique to a vendor, and therefore the SID and/or NID may correspond to a group of that vendor's base stations. Accordingly, the WCD may use the SID and/or the NID as a basis to determine the group to which the base station belongs.

In one example, the WCD may use mapping data to map the SID and/or the NID to the determined group. Likewise, the WCD using the determined group as a basis to select a parsing technique from multiple parsing techniques may involve the WCD using mapping data to map the determined group to the parsing technique.

In another respect, disclosed is a method operable in a wireless communication system having a base station and a WCD, where the base station radiates to define multiple coverage areas in which the WCD can operate, and where each coverage area has a respective coverage area identifier. The method may involve the WCD operating within one of the multiple coverage areas, and the WCD receiving from the base station a coverage area identifier of the coverage area in which the WCD operated. Further, the method may involve the WCD receiving a SID and/or NID from the base station, and the WCD using the received SID and/or NID as a basis to select a parsing technique from multiple parsing techniques. Yet further, the method may involve the WCD using the selected parsing technique to parse the received coverage area identifier so as to extract from the received coverage area identifier one or more attributes of the coverage area in which the WCD operated. And yet further, the method may involve the WCD transmitting the extracted one or more attributes to a server. The server may then use the extracted one or more attributes to perform various functions.

In yet another respect, disclosed is a method operable in a wireless communication system having a base station, a WCD, and a server, where the base station radiates to define multiple coverage areas in which the WCD can operate, where each coverage area has a respective coverage area identifier, and where the base station provides connectivity between the WCD and the server. The method may involve the server receiving a coverage area identifier of one of the multiple coverage areas in which the WCD operated, and the server determining a group to which the base station belongs. Further, the method may involve the server using the determined group as a basis to select a parsing technique from multiple parsing techniques, and the server using the selected parsing technique to parse the received coverage area identifier so as to extract from the received coverage area identifier one or more attributes of the coverage area in which the WCD operated.

As discussed above, a server (or WCD) may report network properties to a service provider such that the service provider may analyze them and assess a condition of the network. In some instances, this may involve the server providing to the service provider network properties in a "raw" format. Alternatively or additionally, this may involve the server providing to the service provider visual representations of network properties.

Certain types of network properties may be well-suited to be visually represented. Such properties may include, for example, a position of a centroid (i.e., the center of coverage) of a coverage area, a position of a base station providing the coverage area, and a position of a WCD that operated within the coverage area. With these visual representations, a service provider may more easily assess a condition of the network.

Accordingly, in yet another respect, disclosed is a method operable in a wireless communication system having a base station, a WCD, and a server having a display device. The method may involve the WCD receiving from the base station a position of a centroid of the coverage area in which the WCD operated. The method may further involve the WCD using the received position of the centroid as a basis to determine a position of the base station providing the coverage area. For instance, the WCD may use mapping data to map the received position of the centroid to the position of the base station. Yet further, the method may involve the WCD determining a position of the WCD, such as by using a GPS receiver.

The method may also involve the WCD providing to the server the received position of the base station, the determined position of the centroid, and the determined position of the WCD. And the method may involve the server displaying on the display device (i) a first visual indicator of the position of the centroid, (ii) a second visual indicator of the position of the base station, and (iii) a third visual indicator of the position of the WCD. In addition, the method may involve the server displaying on the display device, (i) a first line connecting the first and second visual indicators, and (ii) a second line connecting the second and third visual indicators. In practice, the functions of the method may be performed repeatedly and at a sufficient frequency such that the visual representations are presented in real-time or near real-time.

These as well as other aspects and advantages will become apparent to those of ordinary skill in the art by reading the following detailed description, with reference where appropriate to the accompanying drawings. Further, it should be understood that the foregoing overview and other arrangements and functions described herein are intended to be examples only and not to limit the scope of the claims.

DETAILED DESCRIPTION

Throughout this disclosure, any reference to "a" or "an" refers to "at least one" and any reference to "the" refers to "the at least one" unless otherwise specified and/or unless the particular context clearly dictates otherwise.

The systems and methods described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and as a combination of hardware, firmware and/or software.

1. EXAMPLE SYSTEM

Referring to the drawings, as noted above, FIG. 1 is a simplified block diagram of an example wireless communication system 100 arranged to implement functions in accordance with the disclosed method. As shown, the system 100 includes a WCD 102, a RAN 104, a transport network 106, and a server 108. Generally, the RAN 104 may be configured to connect the WCD 102 to the transport network 106, and the transport network may be configured to connect the RAN to the server 108. Therefore, the WCD 102 may connect to the server 108 via both the RAN 104 and the transport network 106.

Figure 1:
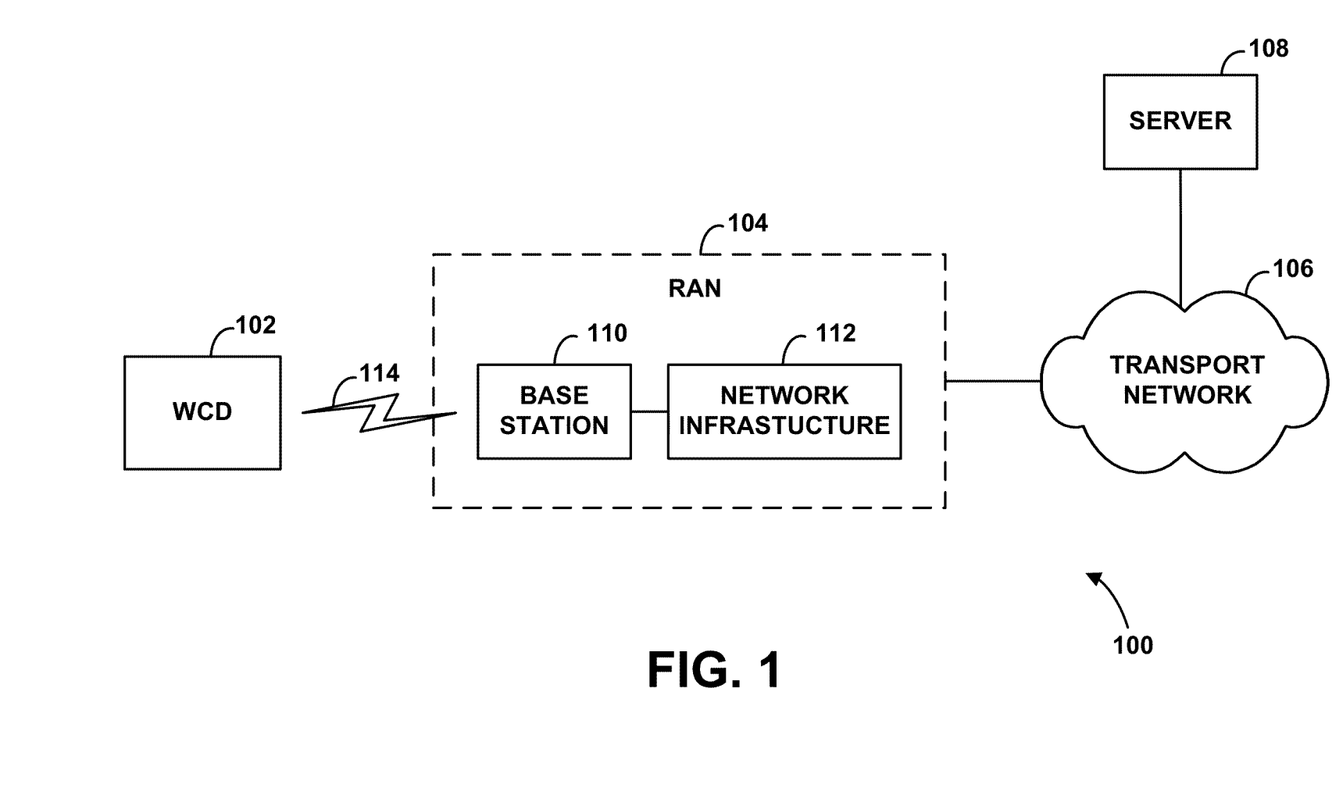
FIG. 1 is a simplified block diagram of a communication system arranged to implement functions in accordance with the disclosed method.

The WCD 102 may take any of a variety of forms, including for example a cellular phone, tablet, laptop, media player, gaming device, or telemetry device. The WCD 102 may be a standalone device or the WCD 102 may be embedded in another device.

The RAN 104 provides wireless connectivity to the transport network 106 and may also take any of a variety of forms. By way of example, the RAN 104 may include a base station 110 and a supporting network infrastructure 112. The WCD 102 may connect with the base station 110 over an air interface 114. And the base station 110 may couple with the network infrastructure 112, which may in turn couple with the transport network 106. Further, the base station 110 or the network infrastructure 112 may include a base station controller (BSC) (not shown) that causes the base station to perform one or more functions.

The base station 110 may radiate to define multiple coverage areas in which the WCD 102 may operate. For example, the base station 110 may include directional antennas that radiate to define various cell sectors, each of which may function as a discrete coverage area of the base station. In addition, each coverage area may have a respective coverage area identifier as described above.

The transport network 106 may also take a variety of forms. For example, the transport network may be the PSTN or a packet-switched network such as the Internet. Likewise, the server 108 may take a variety of forms.

In general, the system 100 may operate in accordance with a particular air interface protocol or "radio access technology," with communications from the base station 110 to the WCD 102 defining a downlink or forward link and communications from the WCD 102 to the base station 110 defining an uplink or reverse link. Examples of existing air interface protocols include, without limitation, Code Division Multiple Access (CDMA) (e.g., 1xRTT and 1xEV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH. Each protocol may define its own procedures for registration of WCDs, initiation of communications, handoff or handover between coverage areas, and other functions related to air interface communication.

In order for the RAN 104 to connect the WCD 102 to the transport network 106, the base station 110 establishes a radio link with the WCD over the air interface 114. The process of establishing a radio link may take various forms depending on the protocol used for communication. By way of example, the WCD 102 may request a radio link by sending a radio link request message over the air interface 114 to the base station 110. The base station 110 may then detect that the message is a radio link request message, and the base station may responsively assign to the WCD 102 a traffic channel resource that facilitates air interface communication of bearer traffic between the base station and the WCD.

The WCD 102 may then establish a data link with an entity in the network infrastructure 112 such that the WCD may communicate with the server 108 via the transport network 106. Notably however, the WCD 102 may communicate with the server using other techniques (e.g., based on short messaging service (SMS) protocol).

2. EXAMPLE APPARATUS

Figure 2:
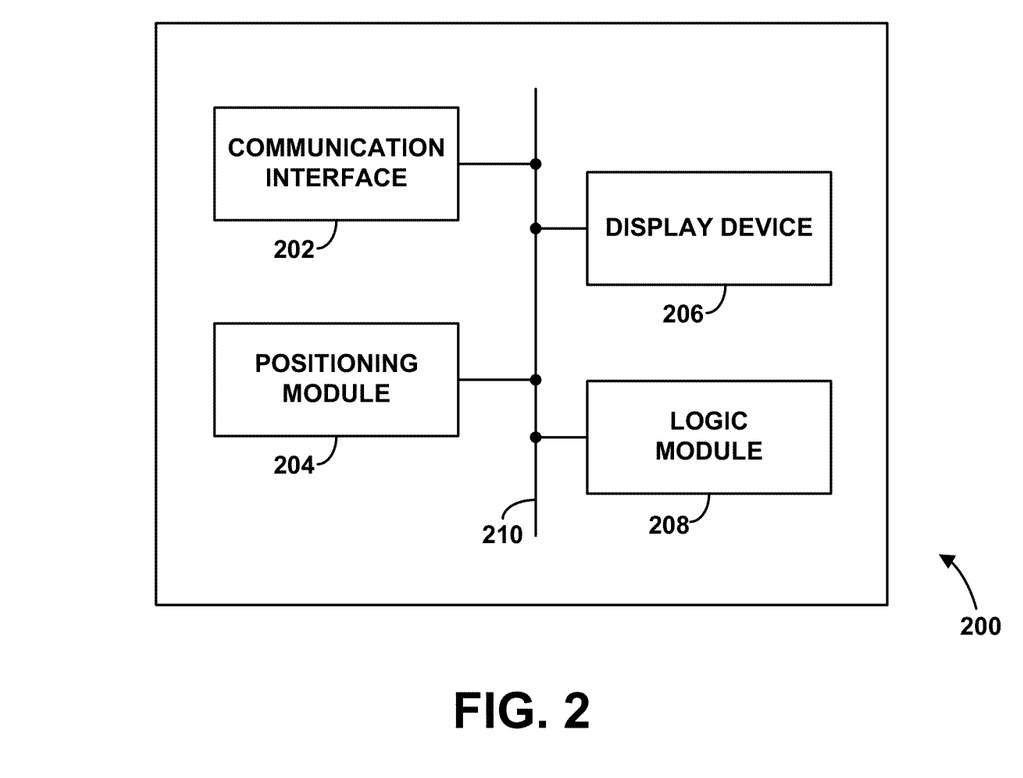
FIG. 2 is a simplified block diagram depicting example components of an apparatus arranged to implement functions in accordance with the disclosed method.

FIG. 2 is next a simplified block diagram depicting example components of an apparatus 200 arranged to implement functions in accordance with the disclosed method. The apparatus 200 can take the form of one or more of the entities included in the system 100 described above. For example, the apparatus 200 can take the form of the WCD 102 or the server 108.

As shown, the apparatus 200 may include a communication interface 202, a positioning module 204, a display device 206, and a logic module 208, all of which can be coupled together by a system bus, network, or other connection mechanism 210. The communication interface 202 may take a variety of forms and may be configured to communicate with one or more entities according to any number of protocols. Further, the positioning module 204 may take a variety of forms and may be configured to determine the position of the WCD. For example, the positioning module 204 may take the form of a GPS receiver configured to determine the latitudinal and longitudinal position of the WCD.

The logic module 204 may also take a variety of forms. For example, the logic module 204 may take the form of a processor and a data storage. The processor can include one or more general-purpose processors (e.g., microprocessors) and/or special-purpose processors (e.g., digital signal processors and/or application specific integrated circuits) and may be integrated in whole or in part with the communication interface 202. In addition, the data storage may include one or more volatile and/or non-volatile storage components and may be integrated in whole or in part with the processor. In one example, the data storage can take the form of a non-transitory computer-readable medium and may contain program instructions, that when executed by the processor, cause the apparatus 200 or another entity to perform one or more of the functions described herein. The data storage may also be used for other purposes. For example, the data storage may be used to store mapping data that may be used with select functions as described in greater detail below.

3. EXAMPLES METHODS

Figure 3:
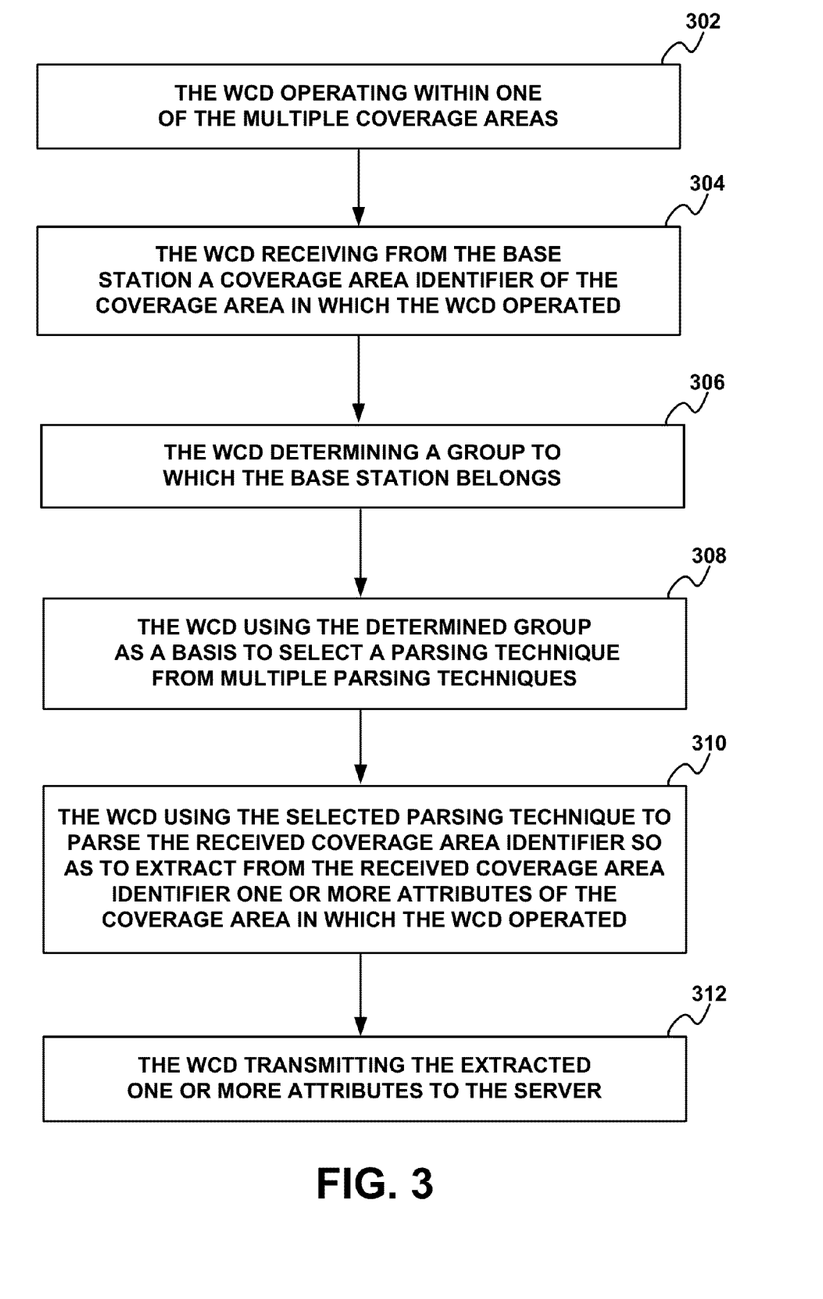
FIG. 3 is a flow chart depicting example functions in accordance with a first example of the disclosed method.

FIG. 3 is next a flow chart depicting example functions in accordance with a first example of the disclosed method. The method can be operable in a wireless communication system having a base station and a WCD, where the base station radiates to define multiple coverage areas in which the WCD can operate, and where each coverage area has a respective coverage area identifier. For example, the method may be operable in the system 100.

At block 302, the method may involve the WCD operating within one of the multiple coverage areas. And at block 304, the method may involve the WCD receiving from the base station a coverage area identifier of the coverage area in which the WCD operated (and still be operating within). As noted above, a coverage area identifier includes, embedded therein according to a particular format, one or more attributes of the respective coverage area. And these attributes may uniquely identify the coverage area.

The coverage area identifier may take a variety of forms. For example, where the system operates in accordance with a CDMA protocol, the coverage area identifier may take the form of a so-called base station identifier (BSID). Note that despite its name, a BSID actually identifies a coverage area, not merely a base station. A BSID is typically a twelve-bit binary string, and includes embedded therein according to a particular format, a tower identifier and a sector identifier. Together, the tower identifier and sector identifier uniquely identify the coverage area.

As noted above, different coverage area identifiers may have different formats. The following example further illustrates this point. In this example, two coverage area identifiers are each twelve-bit binary strings and each have the same value, namely "1010111100001010." Each coverage area identifier also has a respective tower identifier and a respective sector identifier embedded therein. However, each coverage area identifier has a different format. In particular, the first identifier has a first format, which specifies that bits one though twelve represent the tower identifier and that bits thirteen through sixteen represent the sector identifier. As such, the first identifier includes a tower identifier with the value "101011110000," and a sector identifier with the value "1010." And the second identifier has a second format, which specifies that the concatenation of bits one though eight and thirteen though sixteen represent the tower identifier and that bits nine through twelve represent the sector identifier. As such, the second identifier includes a tower identifier with the value "101011111010," and a sector identifier with the value "0000." Notably, the tower identifier and sector identifier values embedded in the second identifier are different from those embedded in the first identifier.

As such, even if a WCD receives a coverage area identifier from its serving base station, the WCD (or another entity) would need to know the format of the identifier in order to parse the identifier and extract the one or more attributes included therein.

As another example, where the system operates in accordance with an LTE protocol, the coverage area identifier may take the form of an LTE cell identifier. An LTE cell identifier is typically a twenty-eight bit binary string, and includes, embedded therein according to a particular format (which may vary depending on the technology of the LTE system), an eNodeB identifier that itself uniquely identifies a coverage area.

In some instances, the base station may provide a coverage area identifier over a designated broadcast channel (e.g., a network control channel). Therefore, by tuning to that channel, a WCD may receive the coverage area identifier. In addition or in the alternative, the WCD may specifically request the coverage area identifier, and in response, the base station may provide the coverage area identifier to the WCD over a traffic channel, for instance.

At block 306, the method may involve the WCD determining a group to which the base station belongs. In one example, each base station within the system may belong to one of multiple groups. For example, the base stations may be grouped according to vendor. However, other groupings are also possible. Each group may also have a format for its coverage area identifiers and the format may vary from group to group. Likewise, each group may have a coverage area identifier parsing technique that is modeled after its respective coverage area identifier format.

The act of determining the group to which the base station belongs may take a variety of forms. For example, the act may involve the WCD receiving a SID and/or NID from the base station, and the WCD using the received SID and/or NID as a basis to determine the group to which the base station belongs.

The base station may provide the SID and/or NID to the WCD in a variety of ways, such as via a broadcast channel or a traffic channel as described above in connection with the coverage area identifier. Also, in some instances the WCD may receive multiple types of data at once from the base station. For example, the WCD may receive a coverage area identifier and a SID and/or NID that are all combined together (e.g., in a "system parameters" message).

The act of the WCD using the received SID and/or NID as a basis to determine the group to which the base station belongs can also take a variety of forms. For instance, the act may involve the WCD using mapping data to map the SID and/or NID to the group. In one example, the mapping data may be a table where each row in the table has a respective unique SID and NID pair, and a respective group identifier. Therefore, by matching the received SID and NID to a row in the table, the WCD may match the received SID and NID to a group identifier that identifies the group in which the base station belongs.

In some instances, the WCD may determine its position and use this determined position as a basis to obtain mapping data. As such, the WCD may send the determined position of the WCD to the server. And in response, the server may send to the WCD a subset of mapping data from a superset of mapping data, where the subset of mapping data is relevant to an area within a threshold distance of the position of the WCD. The WCD may then store this subset of mapping data locally in the WCD.

At block 308, the method may involve the WCD using the determined group as a basis to select a parsing technique from multiple parsing techniques. As discussed above, each group can have a parsing technique, and therefore the WCD selects one of multiple parsing techniques. The act of the WCD using the determined group as a basis to select the parsing technique from multiple parsing techniques can also take a variety of forms. For instance, this act may involve the WCD using mapping data to map the determined group to the selected parsing technique. In one example, the mapping data may be a table where each row in the table has a respective unique group identifier and a respective parsing technique. Therefore, by matching the group to a row in the table, the WCD may match the group to a parsing technique.

The parsing technique may be specified in a variety of ways. For example, the parsing technique may be specified as a set of instructions that the WCD may perform to extract one or more attributes from a coverage area identifier. As such, a parsing technique may specify that a WCD extract bits one though twelve of a coverage area identifier and use those bits to represent a tower identifier. Further, the parsing technique may specify that the WCD extract bits thirteen through sixteen of the coverage area identifier and use those bits as the sector identifier.

At block 310, the method may involve the WCD using the parsing technique to parse the received coverage area identifier so as to extract from the received coverage area identifier one or more attributes of the coverage area in which the WCD operated. For example, where the system operates in accordance with a CDMA protocol and the coverage area identifier takes the form of a BSID, the WCD may extract from the BSID a tower identifier and sector identifier. As another example, where the system operates in accordance with an LTE protocol and the coverage area identifier takes the form of an LTE cell identifier, the WCD may extract from the LTE cell identifier an eNodeB identifier.

At block 312, the method may involve the WCD transmitting the extracted one or more attributes to the server. In practice, the WCD may also monitor and send additional data to the server, including for example data related to the established connection between the WCD and the base station that is providing the coverage area. This data may help a service provider (or another entity or individual) assess the condition of the system.

Figure 4:
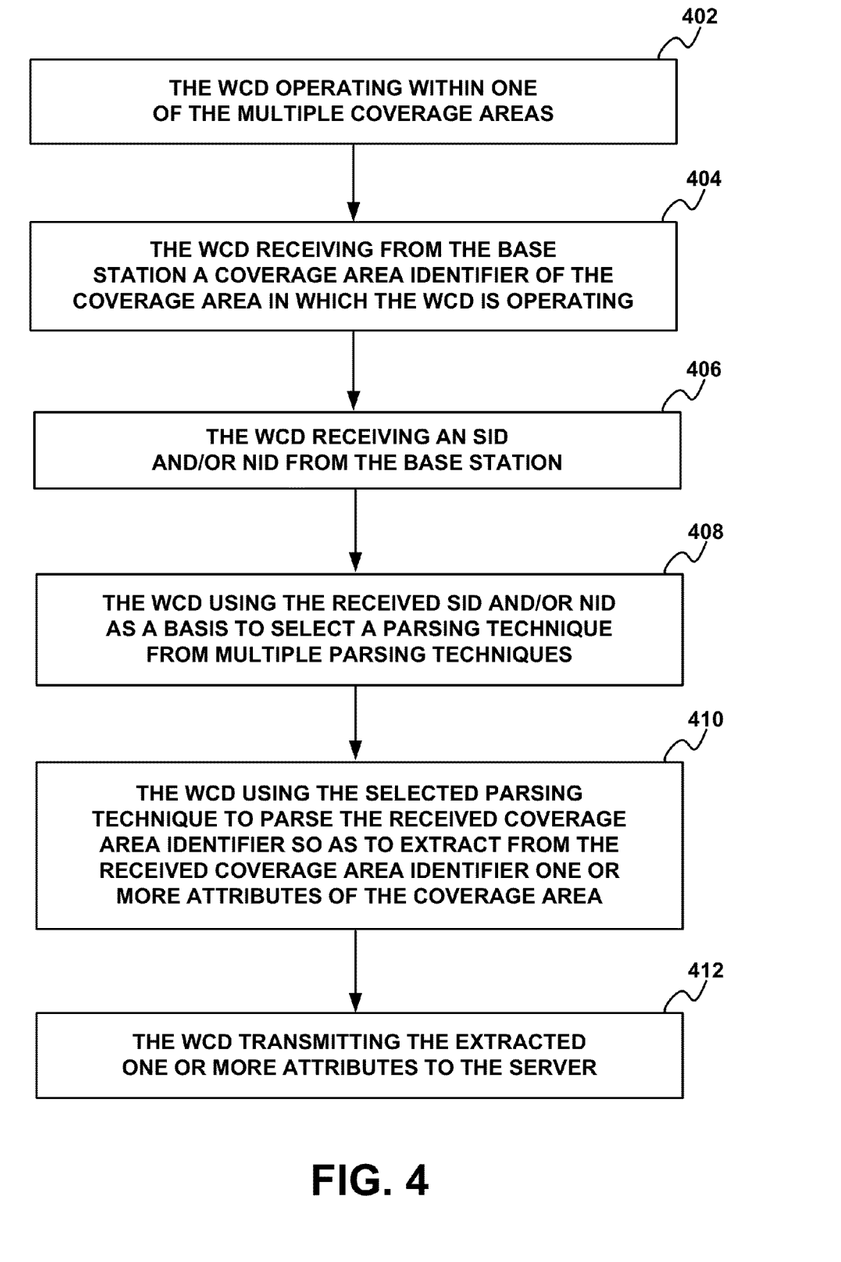
FIG. 4 is a flow chart depicting example functions in accordance with a second example of the disclosed method.

FIG. 4 is next a flow chart depicting example functions in accordance with a second example of the disclosed method. The method may be operable in a wireless communication system having a base station and a WCD, where the base station radiates to define multiple coverage areas in which the WCD can operate, and where each coverage area has a respective coverage area identifier.

At block 402, the method may involve the WCD operating within one of the multiple coverage areas. At block 404, the method may involve the WCD receiving from the base station a coverage area identifier of the coverage area in which the WCD operated (and may still be operating within).

At block 406, the method may involve the WCD receiving a SID and/or NID from the base station. At block 408, the method may involve the WCD using the received SID and/or NID as a basis to select a parsing technique from multiple parsing techniques. This may involve the WCD using mapping data to map the received SID and/or NID to the parsing technique. In one example, the mapping data may be a table where each row in the table has a respective unique SID and NID pair, and a respective parsing technique. Therefore, by matching the received SID and NID to a row in the table, the WCD may match the received SID and NID to a parsing technique.

The WCD may also determine its position and use that determined position to obtain mapping data as described above.

At block 410, the method may involve the WCD using the selected parsing technique to parse the received coverage area identifier so as to extract from the received coverage area identifier one or more attributes of the coverage area in which the WCD operated. And at block 412, the method may involve the WCD transmitting the extracted one or more attributes to the server.

Figure 5:
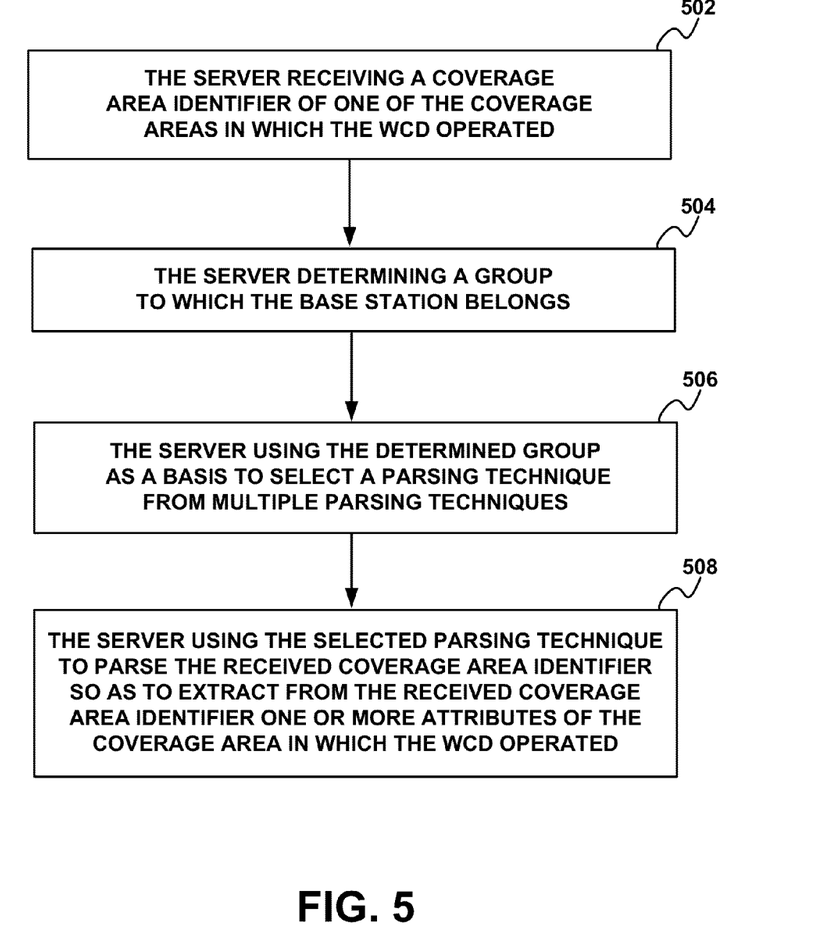
FIG. 5 is a flow chart depicting example functions in accordance with a third example of the disclosed method.

FIG. 5 is next a flow chart depicting example functions in accordance with a third example of the disclosed method. The method can be operable in a wireless communication system having a base station, a WCD, and a server, where the base station radiates to define multiple coverage areas in which the WCD can operate, where each coverage area has a respective coverage area identifier, and where the base station provides connectivity between the WCD and the server. For example, the method can be operable in the system 100.

At block 502, the method may involve the server receiving a coverage area identifier of one of the multiple coverage areas in which the WCD operated (and may still be operating within). Then at block 504, the method may involve the server determining a group to which the base station belongs.

The act of determining the group to which the base station belongs may take a variety of forms. For example, the act may involve the server receiving a SID and/or NID from the WCD (that the WCD itself received from a base station), and the server using the received SID and/or NID as a basis to determine the group to which the base station belongs.

The act of the server using the received SID and/or NID as a basis to determine the group to which the base station belongs can also take a variety of forms. For instance, the act may involve the server using mapping data to map the SID and/or NID to the group in a manner similar to that discussed above in connection with the WCD. Notably, the mapping data described above in connection with the WCD may also be stored in the server such that the server may use such mapping data as needed.

Further, at block 506, the method may involve the server using the determined group as a basis to select a parsing technique from multiple parsing techniques, such as by using mapping data in a manner similar to that discussed above in connection with the WCD. And at block 508, the method may involve the server using the selected parsing technique to parse the received coverage area identifier so as to extract from the received coverage area identifier one or more attributes of the coverage area in which the WCD operated, again such as by using mapping data in a manner similar to that discussed above in connection with the WCD.

Figure 6:
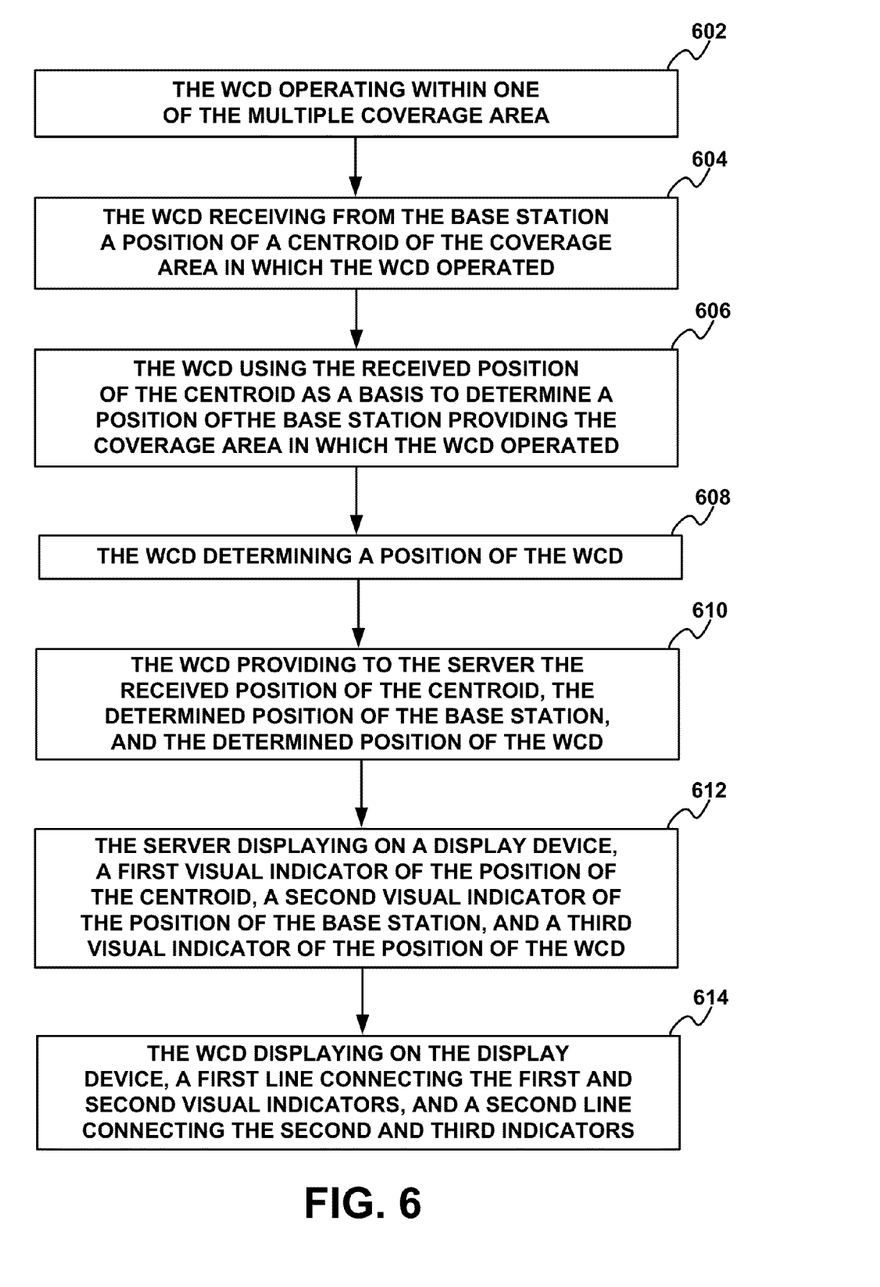
FIG. 6 is a flow chart depicting example functions in accordance with a fourth example of the disclosed method.

As noted above, a service provider may benefit from having visual representations of certain network properties. A fourth example of the disclosed method addresses this issue. FIG. 6 is next a flow chart depicting example functions in accordance with the fourth example of the disclosed method.

The method may be operable in a wireless communication system having a base station, a WCD, and a server having a display device, where the base station radiates to define multiple coverage areas in which the WCD can operate, and where each coverage area has a respective coverage area identifier. For example, the method may be operable in the system 100.

At block 602, the method may involve the WCD operating within one of the multiple coverage areas. And at block 604, the method may involve the WCD receiving from the base station a position of a centroid of the coverage area in which the WCD operated (and may still be operating within). This position may be represented, for example, with latitudinal and longitudinal coordinates.

The base station may provide the position of the centroid to the WCD in a variety of ways, such as via a broadcast channel or a traffic channel as described above in connection with the coverage area identifier. Also, in some instances, the position of the centroid may be combined with other data in a "system parameters" message.

At block 606, the method may involve the WCD using the received position of the centroid as a basis to determine a position of the base station that provides the coverage area in which the WCD operated. Typically, a base station does not provide its own position as it does with the position of the centroid. Notably, the position of the centroid is sometimes incorrectly referred to as the position of the base station. As such, despite a base station providing what it purports to be the position of the base station, the base station may actually be providing the position of the centroid.

The act of the WCD using the received position of the centroid as a basis to determine a position of the base station can take a variety of forms. For example, this act may involve the WCD using mapping data to map the received position of the centroid to the position of the base station. In one example, the mapping data may be a table where each row in the table has a respective unique position of a base station and a respective position of a centroid. Therefore, by matching the received position of the base station to a row in the table, the WCD may match the received position of the base station to a position of the centroid.

Additionally or alternatively, the WCD may determine its own position and use that determined position to obtain mapping data as described above in connection with the SID and/or NID. Further, as with the position of the centroid, the position of the base station may be represented with latitudinal and longitudinal coordinates, for instance.

The WCD may also use other data besides the position of the centroid as a basis to determine the position of the base station. For example, the WCD may use a SID and/or NID to the determine position of the base station. This may involve the WCD using mapping data to map the SID and/or NID to the position of the base station such as in the manner described above in connection with the WCD. As another example, the WCD may use an LTE cell identifier to the determine position of the base station. This may involve the WCD using mapping data to map the LTE identifier to the position of the base station such as in a manner similar to that described above in connection with the WCD.

At block 608, the method may involve the WCD determining a position of the WCD, such as by using GPS a receiver.

At block 610, the method may involve the WCD providing to the server the received position of the centroid, the determined position of the base station, and the determined position of the WCD.

At blocks 612 and 614, the method may involve the server displaying on a display device certain visual representations. Accordingly, the functions at blocks 612 and 614 are described with reference to FIG. 7, which provides an example output of a display device 700.

Figure 7:
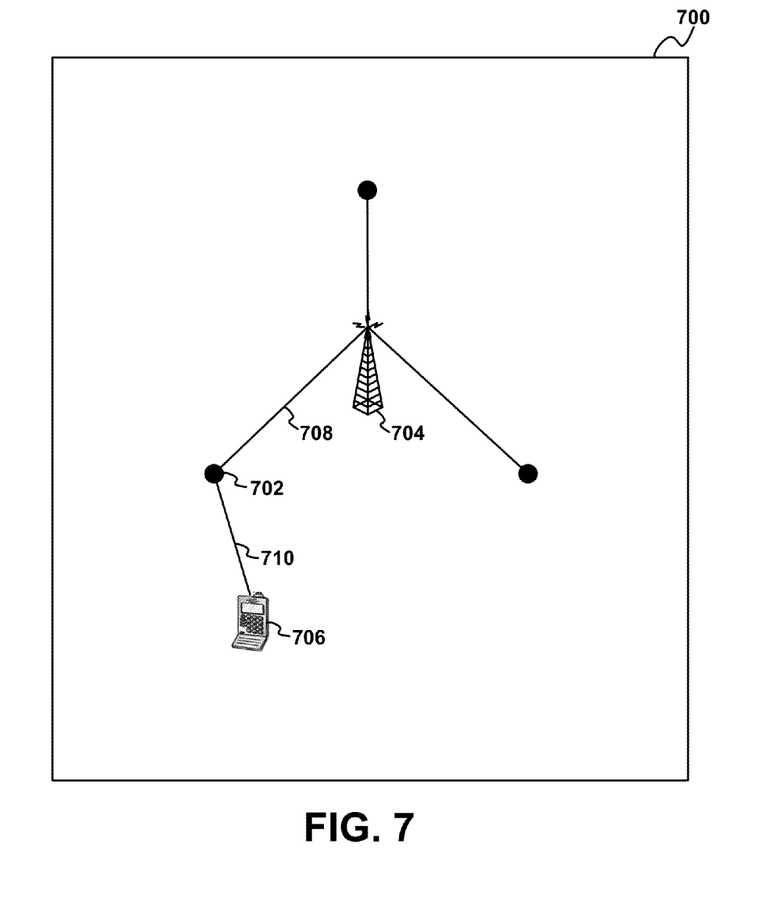
FIG. 7 is an example output of a display device in accordance with the disclosed method.

More particularly, at block 612 the method may involve the server displaying on the display device 700, (i) a first visual indicator 702 of the position of the centroid, (ii) a second visual indicator 704 of the position of the base station, and (iii) a third visual indicator 706 of the position of the WCD. And at block 614, the method may involve the server displaying on the display device 700, a first line 708 connecting the first and second visual indicators, and a second line 710 connecting the second and third visual indicators. As described, the server may perform the functions at blocks 612 and 614. However, the WCD may instead perform such functions such that the WCD displays visual representations on its display device.

In practice, the functions of this method may be performed repeatedly and at a sufficient frequency such that the display device can present the visual representations in real-time or near real-time. As such, as a WCD moves though a coverage area, the third visual indicator and the second line may move consistent with the WCD's movement. To further assist the service provider, geographical mapping data may overlay the visual indicators.

Further, the functions of this method may also be performed in connection with multiple other WCDs, coverage areas, and/or base stations in the wireless communication system. This may allow the display device to depict the process of a WCD transitioning from one coverage area to another coverage area (e.g., by updating the third visual indicator, and the first and second lines as appropriate).

3. CONCLUSION

While certain examples have been discussed above, those skilled in the art will understand that changes and modifications may be made to these examples without departing from the true scope and spirit of the present invention, which is defined by the claims.

What is claimed is:

1. A method operable in a wireless communication system having a base station and a wireless communication device (WCD), wherein the base station radiates to define multiple coverage areas in which the WCD can operate, and wherein each coverage area has a respective coverage area identifier, the method comprising:

the WCD operating within one of the multiple coverage areas;

the WCD receiving from the base station the coverage area identifier of the coverage area in which the WCD operated;

the WCD receiving a network identifier (NID) from the base station;

the WCD using the received NID as a basis to select a parsing technique from multiple parsing techniques;

the WCD using the selected parsing technique to parse the received coverage area identifier so as to extract from the received coverage area identifier one or more attributes of the coverage area in which the WCD is operated; and the WCD transmitting the extracted one or more attributes to a server.

2. The method of claim 1, further comprising:

the WCD receiving a system identifier (SID) from the base station; and the WCD using the received NID and the received SID as a basis to select the parsing technique from the multiple parsing techniques.

3. The method of claim 1, further comprising:

the WCD determining a position of the WCD; and the WCD using the determined position of the WCD as a basis to obtain mapping data, wherein the WCD using the received NID as a basis to select the parsing technique from the multiple parsing techniques comprises the WCD using the obtained mapping data to map the received NID to the selected parsing technique.

4. The method of claim 1, wherein the one or more attributes comprise a tower identifier of the coverage area in which the WCD operated and a sector identifier of the coverage area in which the WCD operated.

5. The method of claim 1, further comprising:

the WCD receiving a position of a centroid of the coverage area in which the WCD operated;

the WCD using the received position of the centroid as a basis to determine a position of the base station; and the WCD transmitting to the server the determined position of the base station.

6. The method of claim 5, further comprising:

the WCD determining a position of the WCD; and the WCD using the determined position of the WCD as a basis to obtain mapping data, wherein the WCD using the received position of the centroid as the basis to determine the position of the base station comprises using the obtained mapping data to map the received position of the centroid to the determined position of the base station.

7. The method of claim 5, further comprising:

the WCD determining a position of the WCD;

the WCD providing to a server the position of the base station, the position of the centroid, and the position of the WCD; and the server displaying on a display device (i) a first visual indicator of the position of the base station, (ii) a second visual indicator of the position of the centroid, and (iii) a third visual indicator of the position of the WCD.

8. The method of claim 7, further comprising:

the server displaying on the display device (i) a first line connecting the first and second visual indicators, and (ii) a second line connecting the second and third visual indicators.

9. A method operable in a wireless communication system having a base station and a wireless communication device (WCD), wherein the base station radiates to define multiple coverage areas in which the WCD can operate, and wherein each coverage area has a respective coverage area identifier, the method comprising:

the WCD operating within one of the multiple coverage areas;

the WCD receiving from the base station the coverage area identifier of the coverage area in which the WCD operated;

the WCD determining a group to which the base station belongs;

the WCD using the determined group as a basis to select a parsing technique from multiple parsing techniques; and the WCD using the selected parsing technique to parse the received coverage area identifier so as to extract from the received coverage area identifier one or more attributes of the coverage area in which the WCD operated.

10. The method of claim 9, further comprising:

the WCD transmitting the extracted one or more attributes to a server.

11. The method of claim 9, wherein the WCD determining the group to which the base station belongs comprises:

the WCD receiving a network identifier (NID) from the base station; and the WCD using the received NID as a basis to determine the group to which the base station belongs.

12. The method of claim 11, wherein the WCD determining the group to which the base station belongs further comprises:

the WCD receiving a system identifier (SID) from the base station; and the WCD using the received NID and the received SID as a basis to determine the group to which the base station belongs.

13. The method of claim 11, further comprising:

the WCD determining a position of the WCD; and the WCD using the determined position of the WCD as a basis to obtain mapping data, wherein the WCD using the received NID as the basis to determine the group to which the base station belongs comprises the WCD using the obtained mapping data to map the received NID to the determined group.

14. The method of claim 9, wherein the one or more attributes comprise a tower identifier of the coverage area in which the WCD operated and a sector identifier of the coverage area in which the WCD operated.

15. The method of claim 9, further comprising:

the WCD receiving a position of a centroid of the coverage area in which the WCD operated;

the WCD using the received position of the centroid as a basis to determine a position of the base station; and the WCD transmitting to the server the determined position of the base station.

16. The method of claim 15, the method further comprising:

the WCD determining a position of the WCD; and the WCD using the determined position of the WCD as a basis to obtain mapping data, wherein the WCD using the received position of the centroid as the basis to determine the position of the base station comprises using the obtained mapping data to map the received position of the centroid to the determined position of the base station.

17. The method of claim 15, further comprising:

the WCD determining a position of the WCD;

the WCD providing to a server the position of the base station, the position of the centroid, and the position of the WCD; and the server displaying on a display device (i) a first visual indicator of the position of the base station, (ii) a second visual indicator of the position of the centroid, and (iii) a third visual indicator of the position of the WCD.

18. The method of claim 17, further comprising:

the server displaying on the display device (i) a first line connecting the first and second visual indicators and (ii) a second line connecting the second and third visual indicators.

19. A method operable in a wireless communication system having a base station, a wireless communication device (WCD), and a server, wherein the base station radiates to define multiple coverage areas in which the WCD can operate, wherein each coverage area has a respective coverage area identifier, and wherein the base station provides connectivity between the WCD and the server, the method comprising:

the server receiving a coverage area identifier of one of the multiple coverage areas in which the WCD operated;

the server determining a group to which the base station belongs;

the server using the determined group as a basis to select a parsing technique from multiple parsing techniques; and the server using the selected parsing technique to parse the received coverage area identifier so as to extract from the received coverage area identifier one or more attributes of the coverage area in which the WCD operated.

20. The method of claim 19, wherein the one or more attributes comprise a tower identifier of the coverage area in which the WCD operated and a sector identifier of the coverage area in which the WCD is operated.

* * * * *